(12) United States Patent
Saeda et al.

(10) Patent No.: US 12,452,379 B2
(45) Date of Patent: *Oct. 21, 2025

(54) INFORMATION PROCESSING APPARATUS, INFORMATION PROCESSING SYSTEM AND CONTROL METHOD

(71) Applicant: SHARP KABUSHIKI KAISHA, Sakai (JP)

(72) Inventors: Masao Saeda, Sakai (JP); Yasuhiro Nakai, Sakai (JP); Kohji Katamoto, Sakai (JP); Kohichi Murakami, Sakai (JP); Yasutomo Hayano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,894

(22) Filed: Jan. 3, 2024

(65) Prior Publication Data
US 2024/0146853 A1 May 2, 2024

Related U.S. Application Data

(63) Continuation of application No. 17/828,808, filed on May 31, 2022, now Pat. No. 11,889,035, which is a
(Continued)

(30) Foreign Application Priority Data

Jan. 15, 2020 (JP) ................. 2020-004069

(51) Int. Cl.
*H04N 1/04* (2006.01)
*G03G 15/00* (2006.01)
*H04N 1/00* (2006.01)

(52) U.S. Cl.
CPC ..... *H04N 1/00689* (2013.01); *G03G 15/5016* (2013.01); *H04N 1/00403* (2013.01); *H04N 1/00697* (2013.01)

(58) Field of Classification Search
CPC .......... H04N 1/00689; H04N 1/00403; H04N 1/00697; G03G 15/5016
(Continued)

(56) References Cited

U.S. PATENT DOCUMENTS 6,701,095 B1   3/2004  Fujimoto et al.
2007/0205277 A1*  9/2007  Tashiro ............... G07G 1/0036
                                                                   235/383
(Continued)

FOREIGN PATENT DOCUMENTS

JP  2000-201245 A  7/2000
JP  2019-209480 A  12/2019

OTHER PUBLICATIONS

IP.com (Year: 2024).*
(Continued)

*Primary Examiner* — Moustapha Diaby
(74) *Attorney, Agent, or Firm* — ScienBiziP, P.C.

(57) ABSTRACT

The information processing apparatus includes a display. The information processing apparatus accepts user operations via a GUI (graphical user interface) displayed on the display. When the service ends, the forgotten item notification screen is displayed on the display. In the forgotten item notification screen, a forgotten item reminder unit is provided for reminding a user who left behind a reminder target item, including the property of the user used in connection with the service. An individual reminder section is provided in a forgotten item reminder unit, to give an individual reminder to prevent the occurrence of leaving behind of each reminder target item, for a first-type item for which retrieval
(Continued)

| SERVICE | | ORIGINAL | PRINTED MATERIAL | RECEIPTS | PHOTOGRAPHS | CHANGE | CARDS |
|---|---|---|---|---|---|---|---|
| COPY | | ○ | △ | △ | △ | △ | △ |
| PHOTOGRAPHIC PRINT | | — | △ | △ | △ | △ | △ |
| NETWORK PRINT | | — | △ | △ | △ | △ | △ |
| CONTENT PRINT | | — | △ | △ | △ | △ | △ |
| FAX | SEND | ○ | △ | △ | — | △ | △ |
| | RECEIVE | — | — | △ | — | △ | △ |
| SCAN | | ○ | — | △ | — | △ | △ |
| ADMINSTRATIVE | | — | ○ | ○ | — | △ | ○ | cannot be detected and a second-type item for which retrieval can be detected but which has not been retrieved, from among the reminder target items.

14 Claims, 13 Drawing Sheets

Related U.S. Application Data continuation of application No. 17/133,014, filed on Dec. 23, 2020, now Pat. No. 11,381,697.

(58) Field of Classification Search
USPC .......................................................... 358/498
See application file for complete search history.

(56) References Cited

U.S. PATENT DOCUMENTS

| 2010/0191603 | A1* | 7/2010 | Herwig | G06Q 20/18 |
| | | | | 705/16 |
| 2012/0217297 | A1* | 8/2012 | Kim | G06Q 30/06 |
| | | | | 235/380 |
| 2017/0017941 | A1* | 1/2017 | Takahashi | G07G 1/12 |
| 2017/0064104 | A1* | 3/2017 | Oishi | H04N 1/00888 |
| 2019/0251540 | A1* | 8/2019 | Shimura | G06K 7/1413 |

OTHER PUBLICATIONS

ProQuest Search (Year: 2024).*
IP.com search history (Year: 2025).*
ProQuest search history (Year: 2025).*
Non-Final Rejection of U.S. Appl. No. 17/133,014 issued on Oct. 12, 2021.
Notice of Allowance of U.S. Appl. No. 17/133,014 issued on Mar. 9, 2022.
Non-Final Rejection of U.S. Appl. No. 17/828,808 issued on Mar. 28, 2023.
Notice of Allowance of U.S. Appl. No. 17/828,808 issued on Sep. 20, 2023.

* cited by examiner

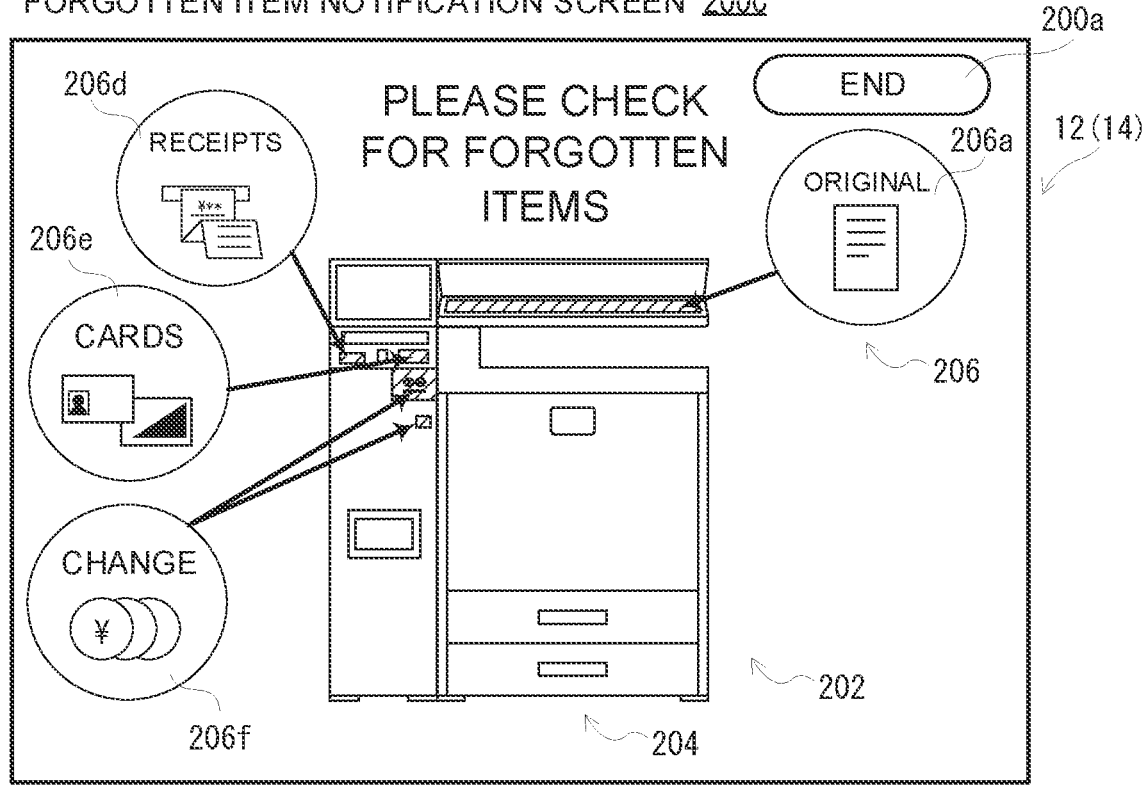

FIG. 6

| SERVICE | | ORIGINAL | PRINTED MATERIAL | RECEIPTS | PHOTOGRAPHS | CHANGE | CARDS |
|---|---|---|---|---|---|---|---|
| COPY | | ○ | △ | △ | △ | △ | △ |
| PHOTOGRAPHIC PRINT | | — | △ | △ | △ | △ | △ |
| NETWORK PRINT | | — | △ | △ | △ | △ | △ |
| CONTENT PRINT | | — | △ | △ | △ | △ | △ |
| FAX | SEND | ○ | △ | △ | — | △ | △ |
| | RECEIVE | — | ○ | △ | — | △ | △ |
| SCAN | | ○ | — | △ | — | △ | △ |
| ADMINSTRATIVE | | — | ○ | ○ | — | △ | ○ |

| SERVICE | ORIGINAL | PRINTED MATERIAL | RECEIPTS | PHOTOGRAPHS | CHANGE | CARDS |
|---------|----------|------------------|----------|-------------|--------|-------|
| COPY | ○ | ○ | ○ | — | ○ | — | ical data-2025-11-20
INFORMATION PROCESSING APPARATUS, INFORMATION PROCESSING SYSTEM AND CONTROL METHOD

CROSS REFERENCE OF RELATED APPLICATION

The present application is a continuation application of U.S. patent application Ser. No. 17/828,808, filed on May 31, 2022, which is a continuation of U.S. patent application Ser. No. 17/133,014, filed on Dec. 23, 2020, which claims priority from Japanese Patent Application No. 2020-004069 filed on Jan. 15, 2020, the contents of which are hereby incorporated by reference into this application.

BACKGROUND OF THE INVENTION

Field of the Invention

The present invention relates to an information processing apparatus, an information processing system, and a control method, particularly to an information processing apparatus, an information processing system, and a control method that provide a predetermined service to a user.

Description of the Background Art

An example of such, according to the background art, is disclosed in Japanese Unexamined Patent Publication No. 2000-201245. The image forming apparatus of the background art includes a target object detection unit and a vocal-sound message output unit. The target object detection unit detects whether the user has left, or the user has been replaced, and whether copied paper remains in the ejection tray or sorter. When the target object detection unit detects that the copied paper remains in the ejection tray even though the operation of the image forming apparatus is completed and the user has left or the user has been replaced, the vocal-sound message output unit outputs a vocal-sound message to announce that the copied paper has been left behind.

However, the image forming apparatus of the background art does not output a vocal-sound message which notifies that an item that cannot be detected by the target object detection unit has been left behind. Therefore, there is a problem in that the users cannot be made aware that they have left behind an item that cannot be detected by the target object detection unit.

Therefore, a main object of the present invention is to provide a novel information processing apparatus, an information processing system, and a control method.

Another object of the present invention is to provide an information processing apparatus, an information processing system, and a control method capable of effectively averting the occurrence of leaving behind of an item related to a predetermined service.

SUMMARY OF THE INVENTION

The first invention is an information processing apparatus that provides a predetermined service to a user, and includes a detection unit, setting unit, and reminder unit. The detection unit detects whether an item has been retrieved, among a plurality of items including property of the user for use in the information processing apparatus and output items output in connection with a service. The setting unit sets, among the plurality of items, a first-type item, for which retrieval cannot be detected, and a second-type item, for which retrieval can be detected but which has not been retrieved, as reminder target items, after the service is executed. The reminder unit gives a reminder to prevent the reminder target item from being left behind, after the service is executed.

The second invention is an information processing apparatus dependent on the first invention. A setting unit sets property of the user that can be used in the service or an output item that is output in connection with the service as a reminder target item.

The third invention is an information processing apparatus dependent on the first invention, further including a specifying unit that specifies, among a plurality of items, property of the user actually used in the service and an output item actually output in connection with the service. The setting unit sets the property of the user actually used in the service and the output items actually output in connection with the service, as the reminder target items.

The fourth invention is an information processing apparatus dependent on the first invention, further including a display. The reminder unit displays, on the display, a notification screen including a reminder section to prevent the occurrence of leaving behind of the reminder target item.

The fifth invention is an information processing apparatus dependent on the fourth invention. The reminder section includes an external diagram of the information processing apparatus, and the reminder unit displays, with emphasis, a predetermined portion in the external diagram corresponding to a predetermined location where the reminder target item exists.

The sixth invention is an information processing apparatus dependent on the fifth invention, further including an input unit that accepts a user operation. The reminder section includes an individual reminder section corresponding to each of the reminder target items. When the individual reminder section corresponding to a first-type item or a predetermined portion in an external diagram, the portion corresponding to a first-type item, is selected by the user via the input unit, the reminder unit stops the reminder for that item corresponding to the relevant individual reminder section or to that portion.

The seventh invention is an information processing apparatus dependent on the sixth invention. The reminder unit gives a warning when the individual reminder section corresponding to a second-type item or the predetermined portion corresponding to the second-type item in an external diagram is selected, and the relevant second-type item is not retrieved.

The eighth invention is an information processing apparatus dependent on the first invention, further including a vocal sound output unit. The reminder unit outputs a vocal sound from the vocal sound output unit to prevent the occurrence of leaving behind of a reminder target item.

The ninth invention is an information processing apparatus dependent on the eighth invention, and the reminder unit does not cause the vocal sound output unit to output the vocal sound for a retrieved item of the second-type items.

The tenth invention is an information processing apparatus dependent on the eighth invention, and the reminder unit outputs, from the vocal sound output unit, a vocal sound for a first-type item and a vocal sound for a second-type item that is not retrieved.

The eleventh invention is an information processing system that includes an information processing apparatus according to the first invention and an image forming apparatus capable of communicating with the information processing apparatus, and a predetermined service is provided to a user by the cooperation of the information processing apparatus and the image forming apparatus.

The twelfth invention is a control method for controlling an information processing apparatus that provides a predetermined service to a user, including (a) detecting whether an item has been retrieved, among a plurality of items including the property of the user used by the information processing apparatus and the output items output in connection with a service; (b) setting, after the service is executed, among the plurality of items, a first-type item for which retrieval cannot be detected and a second-type item for which retrieval can be detected but which has not been retrieved, as reminder target items; and (c) giving a reminder to prevent the occurrence of leaving behind of the reminder target item after the service is executed.

According to the present invention, it is possible to effectively avert the occurrence of leaving behind of an item related to a predetermined service.

The above object and other objects, features, and advantages of the present invention will be more apparent from the following detailed description of embodiments with reference to the drawings.

BRIEF DESCRIPTION OF THE DRAWINGS

FIG. 5C is an illustrative view showing another example of the forgotten item notification screen.

FIG. 6 is a diagram showing the relationship between the services that can be provided by the information processing system and the items that can be targets, as the reminder target items for in each service.

DESCRIPTION OF THE PREFERRED EMBODIMENTS

First Embodiment

Figure 1:
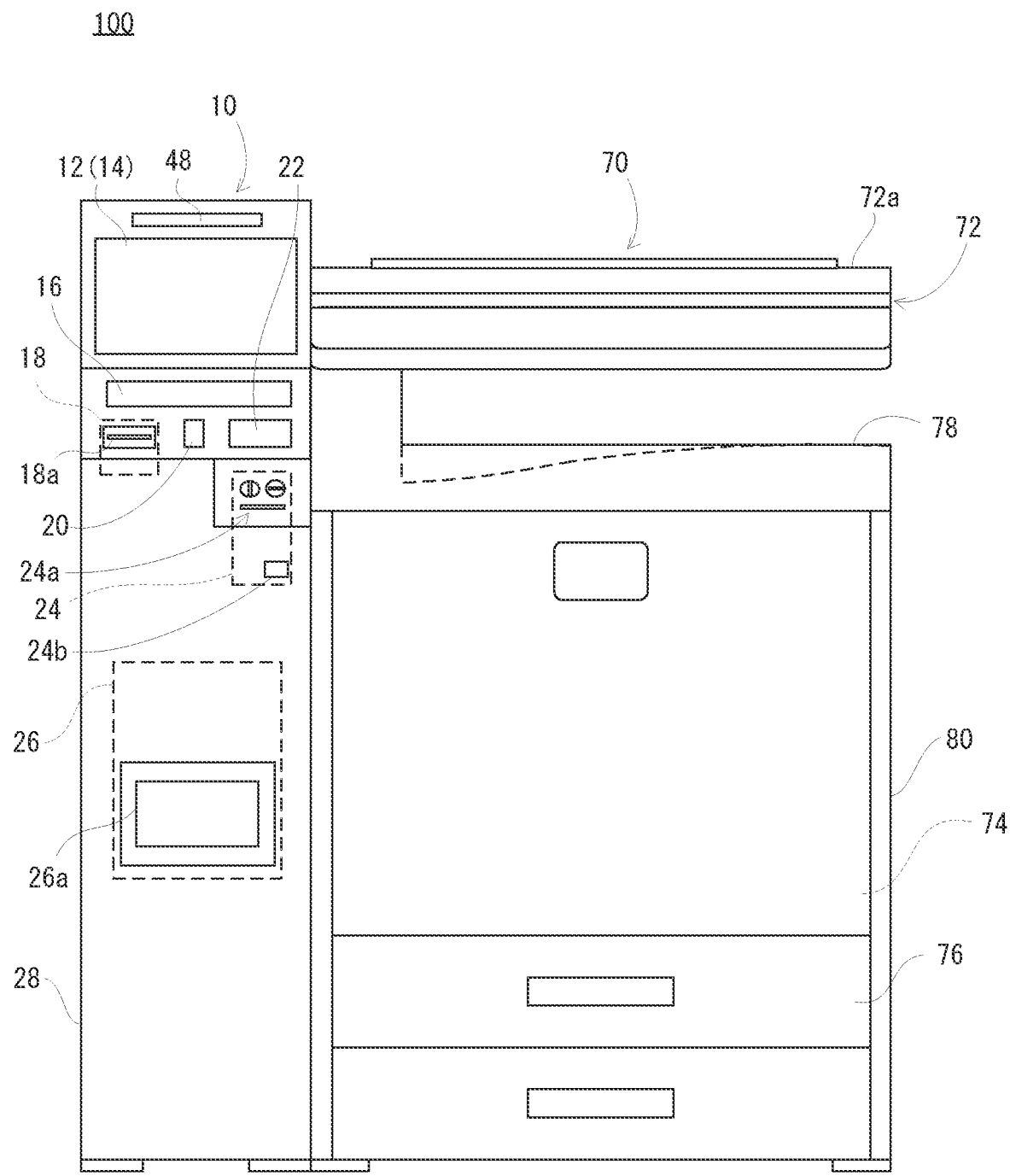
FIG. 1 is an illustrative view showing an external configuration of an information processing system according to an embodiment of the present invention.

FIG. 1 is a diagram illustrating an example of a configuration of an information processing system 100 according to the present invention. Referring to FIG. 1, the information processing system 100 according to the first embodiment of the present invention includes an information processing apparatus 10 and an image forming apparatus 70.

The information processing apparatus 10 is a multimedia kiosk (MMK) terminal arranged in stores such as a supermarket, a restaurant or a convenience store, and public facilities such as a station, a bus terminal, an airport, a government office or a library. The information processing apparatus 10 provides a person who is a user (the user) with various information or a predetermined service (function) according to the place where the information processing apparatus 10 is arranged. Further, as will be described in detail later, the information processing apparatus 10 can also provide predetermined services to a user such as copying, printing, scanning, and faxing in cooperation with the image forming apparatus 70.

In this specification, the front-rear direction (depth direction) of the information processing apparatus 10 and its constituent members is defined by the surface facing the user's standing position, that is, the surface on the side where the display 14 described later is provided, is the front surface (front). The left-right direction (horizontal direction) of the information processing apparatus 10 and its constituent members is defined based on the state in which the user sees the information processing apparatus 10. These matters also apply to the image forming apparatus 70.

The information processing apparatus 10 includes an apparatus main body 28 including a display 14 with a touch panel 12, a storage medium connection unit 16, a paper-piece printer 18, a code reader 20, a short-range communication unit 22, a currency processing unit 24, and a photographic printer 26.

The display 14 with the touch panel 12 is arranged at the upper end of the information processing apparatus 10 (apparatus main body 28). The touch panel 12 is a general-purpose touch panel, and may employ any type of touch panel such as an electrostatic capacitance type, an electromagnetic induction type, a resistance film type, and an infrared type. In the first embodiment, an electrostatic capacitance type touch panel is employed as the touch panel 12, and the touch panel 12 is provided on the display surface of the display 14. However, a touch panel display in which the touch panel 12 and the display 14 are integrally formed may be employed. Further, an LCD or an electro-luminescence (EL) display can be employed as the display 14.

The storage medium connection unit 16 includes a mounting unit (for example, a drive and a memory slot) for mounting various storage media. Various storage media include optical disks (such as CD-R, DVD-R and BD-R) and flash memory (such as USB memory, SD memory cards and memory sticks). Optical discs are mounted in the drive. Also, flash memory is mounted in the memory slot.

The paper-piece printer 18 (third image forming unit) is, for example, a thermal printer (heat-sensitive printer) or a dot impact printer, that issues a piece of paper on which an image such as a receipt, a proof of purchase, a journal, or a coupon is printed. Specifically, the paper-piece printer 18 prints various character strings, images, code patterns (bar codes, etc.) on roll paper, and ejects printed paper pieces from the paper ejection unit 18a.

The code reader 20 includes, for example, a laser scanner or a camera, and can read codes attached to a product, a card, a receipt, or the like, or codes displayed on the screen of a user terminal (mobile terminal). The codes that can be read by the code reader 20 include bar codes (one-dimensional bar codes) and two-dimensional codes (for example, QR codes (registered trademark), micro QR codes, DataMatrix, MaxiCode, VeriCode, etc).

The short-range communication unit 22 performs non-contact data communication wirelessly with a communication target such as an IC card (identification card, membership card, employee ID card, etc.) or a user terminal or the like in accordance with a communication standard such as ISO/IEC18092 (referred to as NFC (Near Field Communication)), for example. The communicable distance of the short-range communication unit 22 is approximately from several cm to several m. The short-range communication unit 22 transmits a signal (reading command) instructing the communication target to read the data stored in the communication target. The communication target transmits the requested data to the short-range communication unit 22 as a response to the reading command. Further, the short-range communication unit 22 transmits a signal (writing command) instructing the communication target to write, together with data (writing data) to be written, to the communication target. The communication target writes (stores) the received writing data in the storage unit of the communication target according to the write command.

The currency processing unit 24 includes a currency insertion unit 24a and a coin return port 24b. The currency insertion unit 24a includes a coin insertion port, a bill insertion port, a change return lever, and the like, and is arranged below the short-range communication unit 22. The coins inserted into the coin insertion port and the bills inserted into the bill insertion port are classified according to type and stored in a predetermined currency storage unit (not shown). The currency storage unit includes a storage unit for coins and a storage unit for bills. When coins or bills are inserted, the amount of inserted money is calculated according to the type and number of coins stored in the storage unit for coins and the type and number of bills stored in the storage unit for bills. When a predetermined service is executed in the information processing apparatus 10, the cost (charge) according to the content of the service is subtracted from the amount of inserted money, and the remainder of the amount of inserted money is calculated. When the change return lever is operated, coins or bills (change) are returned according to the remainder of the amount of inserted money. The coins are returned through the coin return port 24b provided below the currency insertion unit 24a, and the bills are returned through the bill insertion port.

The photographic printer 26 (second image forming unit) is, for example, a dye-diffusion printer or an inkjet printer that prints an image on photographic paper (photograph paper). The photograph printed by the photographic printer 26 is ejected to the ejection unit 26a. Image data stored in the storage medium connected to the storage medium connection unit 16, image data transmitted from an external computer, or the like, is used as the image data for forming an image on the paper. The size of the photograph printed by the photographic printer 26 may be an L size, a 2L size, or the like.

Figure 2:
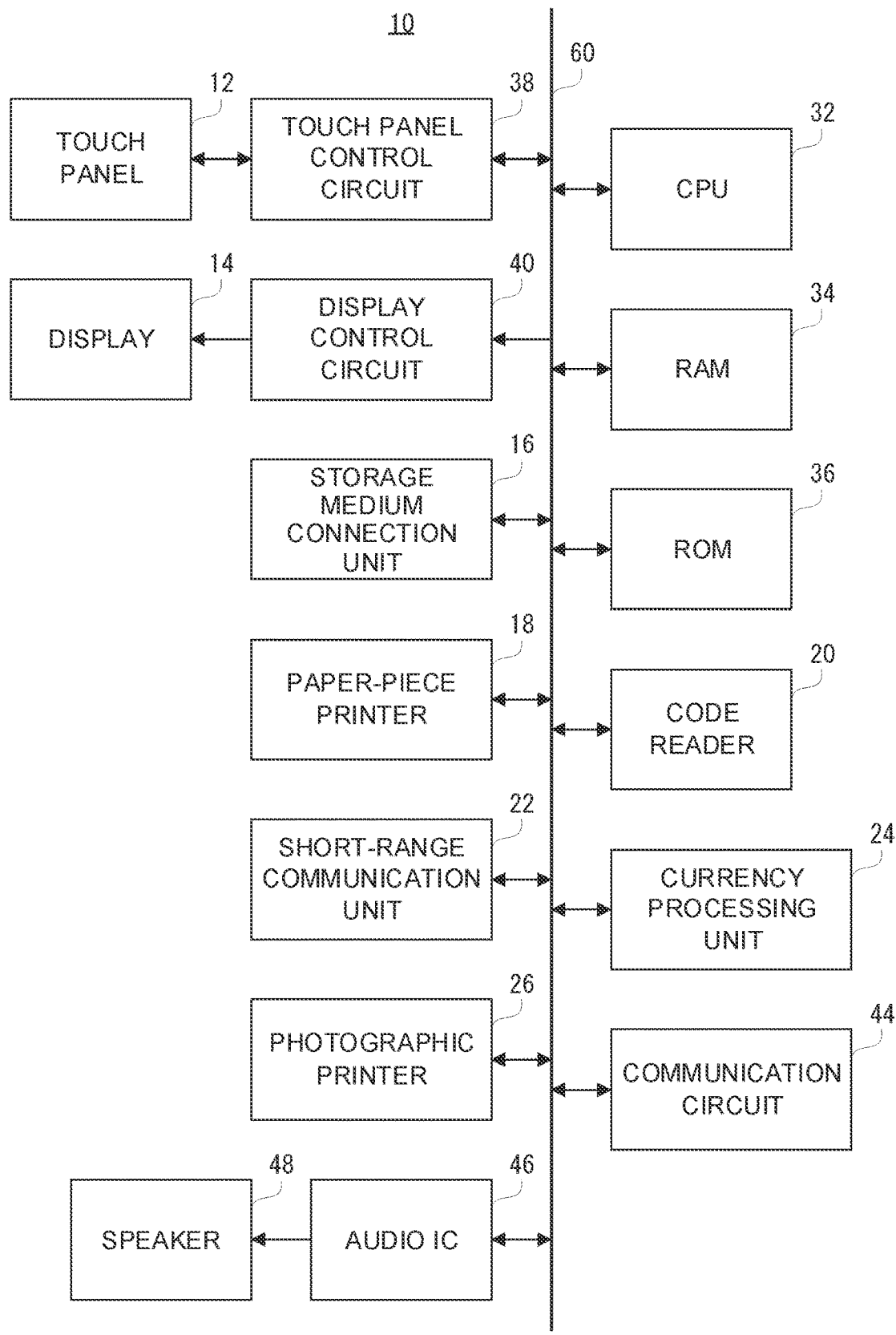
FIG. 2 is a block diagram illustrating an electrical configuration of the information processing apparatus illustrated in FIG. 1.

FIG. 2 is a block diagram illustrating an electrical configuration of the information processing apparatus 10 illustrated in FIG. 1. Referring to FIG. 2, the information processing apparatus 10 includes a CPU 32. The CPU 32 is connected via a bus 60 to the RAM 34, the ROM 36, the touch panel control circuit 38, the display control circuit 40, the storage medium connection unit 16, the paper-piece printer 18, the code reader 20, the short-range communication unit 22, the currency processing unit 24, the photographic printer 26, a communication circuit 44, and an audio IC 46. Further, the touch panel 12 is connected to the touch panel control circuit 38, the display 14 is connected to the display control circuit 40, and the speaker 48 is connected to the audio IC 46.

The CPU 32 manages the overall control of the information processing apparatus 10. The RAM 34 is used as a work area and a buffer area of the CPU 32. The ROM 36 stores default values for various information and the startup program of the information processing apparatus 10.

The touch panel control circuit 38 applies a voltage, or the like, necessary for the touch panel 12, detects a touch operation or a touch input within a valid touch range of the touch panel 12, and outputs, to the CPU 32, the touch coordinate data indicating the position of the touch input.

The display control circuit 40 includes a GPU, a VRAM, and the like. Under instructions from the CPU 32, the GPU generates, in the VRAM, display image data for displaying various screens on the display 14 using image generation data stored in the RAM 34, and outputs the generated display image data to the display 14.

The communication circuit 44 is a communication circuit for connecting to a network such as the Internet. The communication circuit 44 is a wired communication circuit or a wireless communication circuit, and communicates with an external computer (external terminal) such as a server via a network according to instructions from the CPU 32. The communication circuit 44 may directly communicate with the image forming apparatus 70, the user terminal, and the like, wired or wirelessly (for example, infrared system, WiFi (registered trademark) system or Bluetooth (Bluetooth; registered trademark) system) without going through a network.

The audio IC 46 reproduces the vocal-sound data according to instructions from the CPU 32, and outputs the reproduced vocal sound from the speaker 48. Accordingly, the sound or vocal sound (synthetic voice) corresponding to the vocal-sound data is output from the speaker 48.

Note that the electrical configuration of the information processing apparatus 10 illustrated in FIG. 2 is merely one example, and is not limiting.

Returning to FIG. 1, the image forming apparatus 70 is a multifunction device (MFP: Multifunction Peripheral) having a photocopying function, a printer function, a scanner function, a facsimile function, or the like.

The image forming apparatus 70 includes an apparatus main body 80 including an image reader 72, an image forming unit 74, a paper feeding device 76, and a paper ejection tray 78. The image forming apparatus 70 is installed in the vicinity of the information processing apparatus 10. For example, the image forming apparatus 70 is provided adjacent to the right side of the information processing apparatus 10.

The image reader 72 includes a document placement table formed of a transparent material, and is inside the apparatus main body 80. A document holding cover 72a is attached above the document placement table so it can be opened and closed via a hinge or the like.

Further, the image reader 72 includes a light source, a plurality of mirrors, an imaging lens, a line sensor, and the like. The image reader 72 exposes the surface of the document to a light source, and guides the reflected light reflected from the surface of the document to the imaging lens with a plurality of mirrors. Then, the reflected light is imaged on the light receiving element of the line sensor by the imaging lens. The line sensor detects the brightness or chromaticity of the reflected light imaged on the light receiving element, and generates read image data based on the image on the surface of the document. As the line sensor, a CCD (Charge Coupled Device) or a CIS (Contact Image Sensor) or the like is used.

The image forming unit 74 (first image forming unit) is built in the apparatus main body 80 and is provided below the image reader 72. The image forming unit 74 includes a photoconductive drum, a charging device, an exposure device, a developing device, a transfer device, a fixing device, and the like. The image forming unit 74 forms an image by an electrophotographic method on a recording medium (paper for forming an image) conveyed from the paper feeding device 76, or the like, and the paper (printed material) with an image formed thereon is ejected to the paper ejection tray 78 provided between the image reader 72 and the image forming unit 74. The image data read by the image reader 72, the image data transmitted from the information processing apparatus 10, or the image data transmitted from an external computer (such as a server) or the like is used as the image data for forming an image on the paper.

Figure 3:
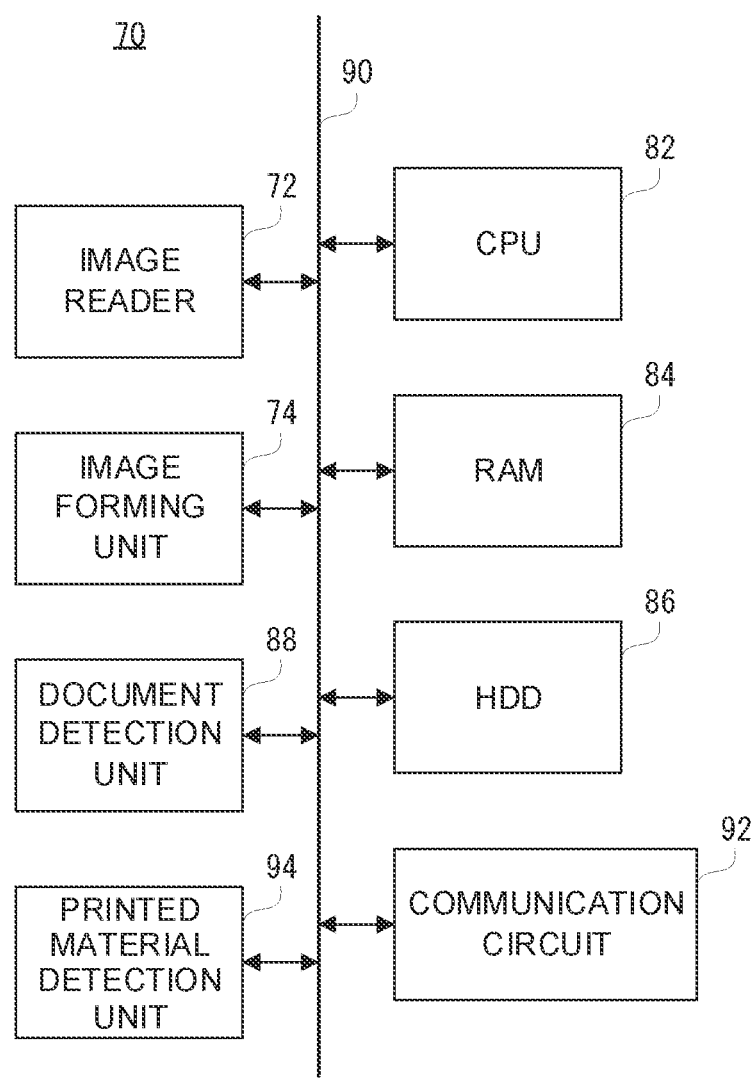
FIG. 3 is a block diagram illustrating an electrical configuration of the image forming apparatus illustrated in FIG. 1.

FIG. 3 is a block diagram illustrating an electrical configuration of the image forming apparatus 70 illustrated in FIG. 1. Referring to FIG. 3, the image forming apparatus 70 includes a CPU 82. The RAM 84, the HDD 86, the image reader 72, the image forming unit 74, the document detection unit 88, the printed material detection unit 94 and the communication circuit 92 are connected to the CPU 82 via the bus 90.

The CPU 82 manages the overall control of the image forming apparatus 70. The RAM 84 is used as a work area and a buffer area of the CPU 82.

The HDD 86 is the main storage device of the image forming apparatus 70, and stores, as appropriate, a control program for the CPU 82 to control the operation of each part of the image forming apparatus 70, display image data of various screens, and the like. However, other non-volatile memory such as SSD, flash memory, EEPROM may be used instead of the HDD 86 or together with the HDD 86.

The document detection unit 88 is provided to detect whether an original is set on the document platen. The specific method for detecting the original is as follows.

As the first detection method, a pre-scan is executed prior to scanning the original (main scan), as a way to determine whether an original exists on the document placement table according to the brightness or chromaticity of the reflected light imaged on the light receiving element of the line sensor. In this case, the image reader 72 also functions as the document detection unit 88. That is, the image reader 72 and the document detection unit 88 can be used as the other.

Further, as a second detection method, a dedicated document detection sensor is provided in the image reader 30 as a way to determine whether an original exists on the document placement table according to an output of the document detection sensor. As the document detection sensor, a reflective photoelectric sensor or a thru-beam photoelectric sensor can be used. For example, the document detection sensor is provided within the range of the document setting position, such as near the left back corner of the document placement table.

Further, as a third detection method, it is determined whether an original exists on the document placement table by the opening and closing of the document holding cover 72a. In this case, when the document holding cover 72a is closed after the document holding cover 72a is opened, it is presumed that an original has been placed on the document placement table, and the original is determined to exist on the document placement table. Further, if the document holding cover 72a is opened once it is determined that the original exists on the document placement table, it is then determined that the original has been removed from the document placement table (no original exists).

The printed material detection unit 94 is provided to detect the presence or absence of the printed material ejected to the ejection tray 78. The printed material detection unit 94 includes an ejected paper sensor for detecting the presence or absence of printed material ejected to the paper ejection tray 78. As the ejected paper sensor, a general-purpose optical sensor or a contact sensor can be used. For example, when a reflective optical sensor is used as the ejected paper sensor, the ejected paper sensor includes a light emitting part and a light receiving part. Depending on whether the paper ejection tray 78 has or does not have printed material, the light output from the light emitting unit is or is not incident on the light receiving unit. Then, based on the output of the ejected paper sensor, it is determined whether there is printed material in the paper ejection tray 78.

The communication circuit 92 is a communication circuit for connecting to a network such as the Internet. The communication circuit 92 is a wired communication circuit or a wireless communication circuit, and communicates with an external computer such as a server via a network according to instructions from the CPU 82. However, the communication circuit 92 can also directly communicate with the information processing apparatus 10 wired or wirelessly without going through a network.

However, the document detection unit 88 and the printed material detection unit 94 are connected to the CPU 32 of the information processing apparatus 10 via the communication circuit 92 and the communication circuit 44, and are controlled by the CPU 32.

The electrical configuration of the image forming apparatus 70 illustrated in FIG. 3 is merely an example, and is not limiting.

In the information processing system 100 having such a configuration, the information processing apparatus 10 accepts user operations via the GUI displayed on the display 14. Specifically, a variety of operation screens (setting screens), are displayed on the display 14 of the information processing apparatus 10, and user operations are accepted in response to touch input into the touch panel 12. That is, the display 14 with the touch panel 12 functions as an input unit that accepts user operations. In the information processing system 100, a predetermined service is executed according to the contents set on the setting screen.

Here, some conventional information processing systems detect the presence or absence of an item such as an original or printed material, and output a vocal-sound message announcing that the item has been left behind when it is determined that there is an occurrence where an item has been left behind.

However, in the conventional information processing system, no vocal-sound message is output to announce when an item, for which presence or absence cannot be detected, has been left behind. For this reason, there is a problem in that the users cannot be made aware that they have left behind an item for which presence or absence cannot be detected.

Figure 4:
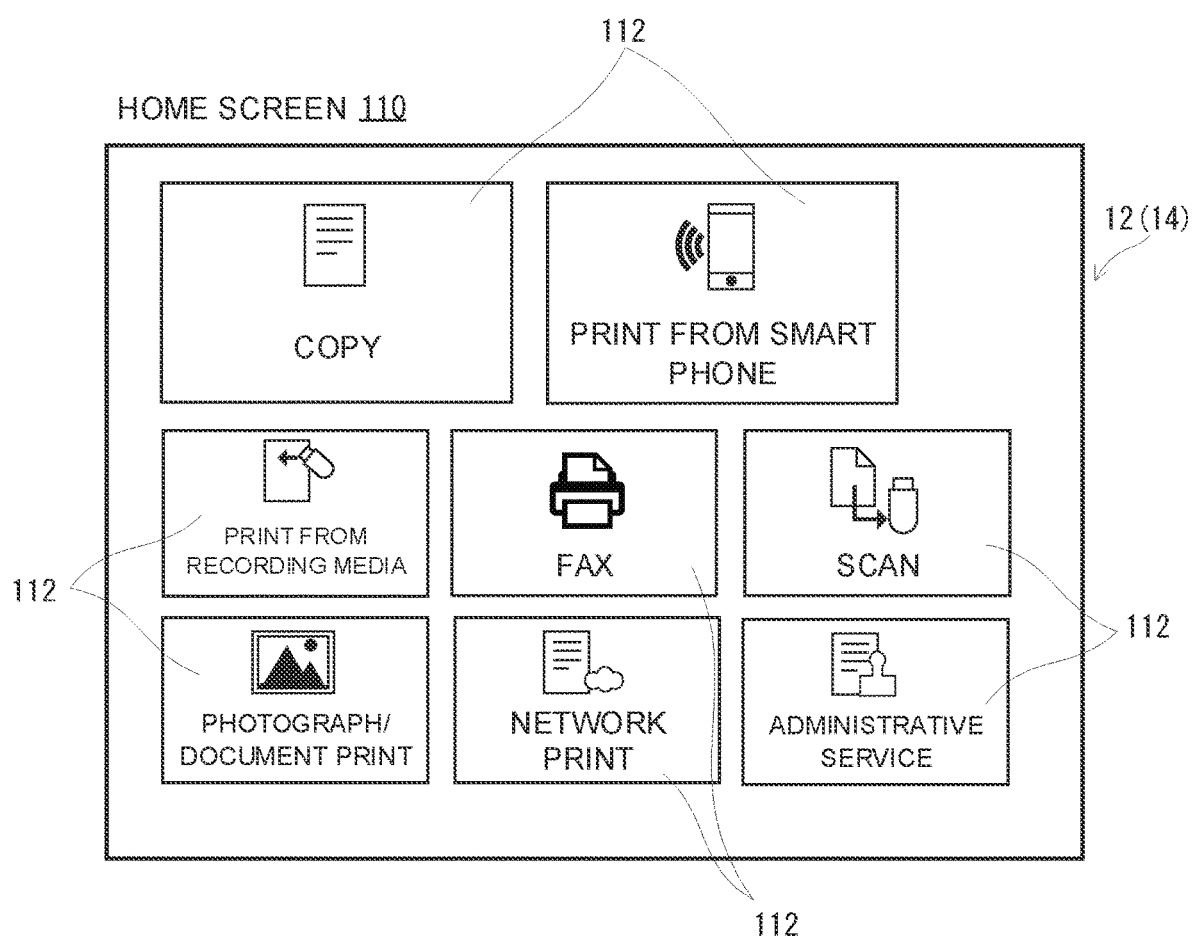
FIG. 4 is an illustrative view showing an example of a home screen.

Hereinafter, a specific operation example of the information processing system 100 will be described with reference to FIGS. 4 to 6. When in a standby state in which each function can be executed, by turning on the main power of the information processing apparatus 10 and the image forming apparatus 70, a home screen 110 as shown in FIG. 4 is displayed on the display 14 of the information processing apparatus 10. The home screen 110 is an operation screen for selecting a service. On the home screen 110, a plurality of keys 112 for selecting a service provided by the information processing system 100 are displayed. However, in the first embodiment, a service means copying, scanning, print (printing), sending and receiving faxes, and the like.

Each of the plurality of keys 112 is an image surrounded by a substantially rectangular frame, and functions as a software key. For each of the plurality of keys 112, a service such as "Copy", "Print from smart phone", "Print from recording media", "Fax", "Scan", "Photograph/document print", "Network print" and "Administrative service" is assigned.

The copy service includes a service for copying (photocopying) an image of paperwork, such as an original, on normal paper (normal copy service) and a service for copying a photograph image on photograph paper (photograph copy service). In addition, the "print from smartphone" service is a print service that uses image data stored in a mobile terminal such as a smartphone, and "print from recording media" service is a print service that uses image data stored in a storage medium, and the "network print" service is a print service that uses image data transmitted from an external computer (server for network print service). Further, the "administrative service" is a print service that uses the image data of the administrative certificate sent from the server of the administrative agency. In each print service, an image forming unit can be selected (specified) from a plurality of image forming units (for example, from an image forming unit 74 (first image forming unit) and a photographic printer 26 (second image forming unit)) to perform printing. For example, a selection screen including a selection key for selecting an image forming unit to print is displayed on the display 14 of the information processing apparatus 10, that is, choices are presented to the user for selecting an image forming unit to print from a plurality of image forming units and it is possible to print from the selected image forming unit.

When the key 112 is touched (operated) on the home screen 110, that is, when a service is selected, a plurality of operation screens for making settings for the selected service are sequentially displayed on the display 14. In the information processing apparatus 10 or the image forming apparatus 70, the predetermined service is executed according to the content set on the setting screen.

Figure 5A:
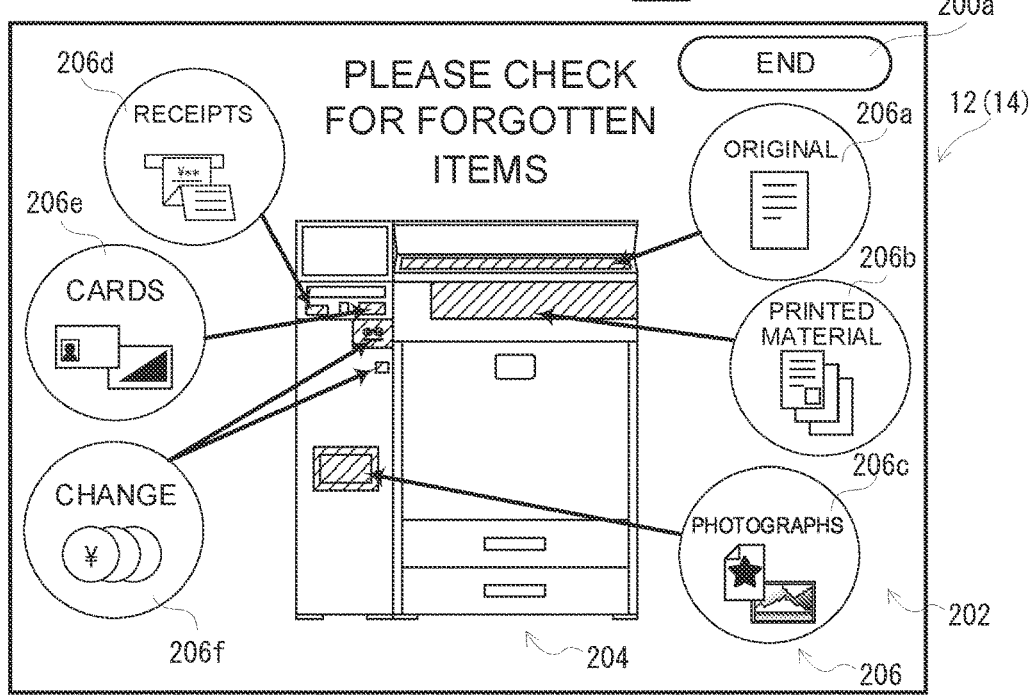
FIG. 5A is an illustrative view showing an example of a forgotten item notification screen.
Figure 5B:
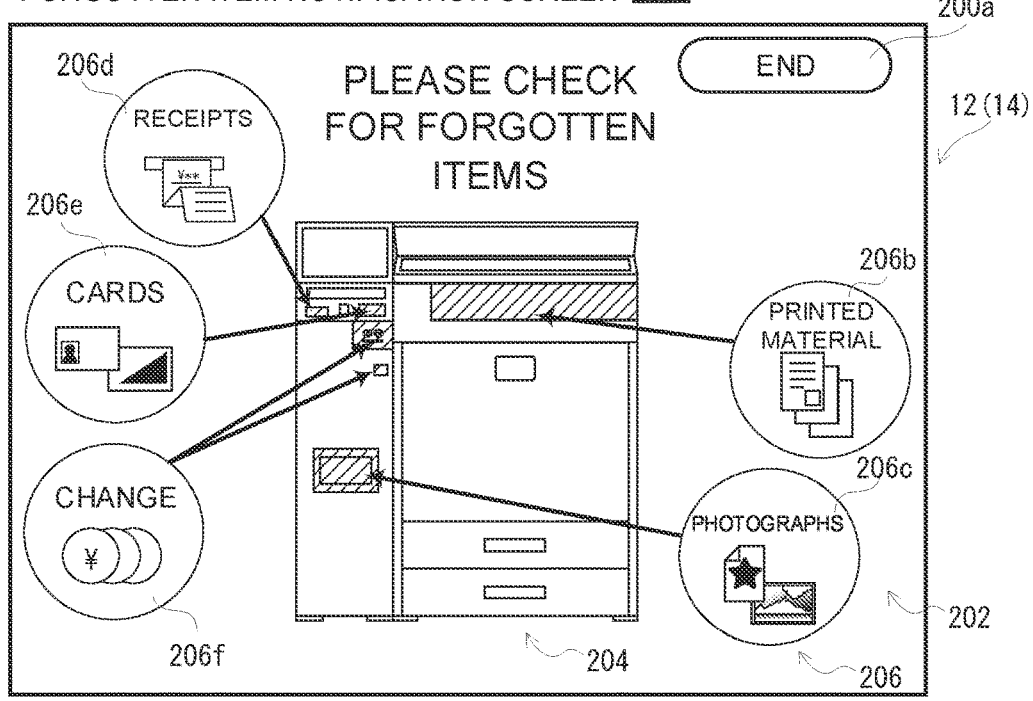
FIG. 5B is an illustrative view showing another example of the forgotten item notification screen.

Then, when the service is ended, that is, after the service is executed, the forgotten item notification screen 200 (200A to 200C) as shown in FIGS. 5A to 5C is displayed on the display 14.

The forgotten item notification screen 200 includes an end key 200a and a forgotten item reminder unit 202. The end key 200a is an operation key for ending the display of the forgotten item notification screen 200. When the end key 200a is operated, the home screen 110 is displayed on the display 14.

The forgotten item reminder unit 202 is provided to remind a user who left behind an item (reminder target item) that is an item which becomes a target for a reminder about leaving behind the item, including the property of the user used related to the service and output items that are output related to the service. The forgotten item reminder unit 202 displays an external diagram 204 of the information processing apparatus 10 and the image forming apparatus 70, and a message for giving a reminder that the reminder target item has been left behind. Further, the forgotten item reminder unit 202 is provided with individual reminder sections 206.

The individual reminder sections 206 are provided to give an individual reminder when each reminder target item is left behind, and are provided for each reminder target item. An individual reminder section 206 includes an icon and an arrow. The icon includes an appropriate figure indicating the content of the reminder target item, a character string indicating the content of the reminder target item, and a frame line surrounding the figure and the character string. The arrow extends from the operation key toward the external diagram 204. This arrow points to a portion corresponding to the location where the reminder target item exists, in turn corresponding to each icon in the external diagram 204.

In addition, a message such as, for example, "Please check for forgotten items." is displayed in the forgotten item reminder unit 202 to give a reminder that a reminder target item has been left behind. Further, although not shown, the portion corresponding to the location where the reminder target item exists in the external diagram 204 may be emphasized when displayed. For example, a pattern is added to a portion corresponding to a location where a reminder target item exists, or an appropriate color is added. A yellow color that can attract the user's attention is preferable because it is a bright reminder of the occurrence of leaving behind of an item. In this way, the user can easily visually perceive the locations where the reminder target item exists.

However, the reminder target items include an original, printed material, photographs, receipts, communication targets of the short-range communication unit 22 (hereinafter, referred to sometimes as "cards"), mobile phone terminals with payment function (enabling electronic settlement), and change (change caused by a cash settlement) and the like. The printed material is on paper for image formation formed by the image forming unit 74 and ejected to the paper ejection tray 78, a photograph is paper for photographs printed by the photographic printer 26, and a receipt is a receipt printed by the paper-piece printer 18. The change is money that needs to be returned to the user (user of the information processing system 100).

Further, in the first embodiment, the reminder target item may be an item that can be used in connection with the service or an item that may be an output item (deliverable product) of the service, and there are a plurality of items for each service.

FIG. 6 shows a list summarizing the relationship between the services that can be provided by the information processing system 100 and the reminder target items relating to service.

A circle shown in FIG. 6 indicates that the item is always used in the service. For example, in copy services, an original is always used. Accordingly, in the copy service, an original corresponds to a circle and is always a reminder target item, and the individual reminder section (the original reminder section) 206a (see FIG. 5A, etc.) corresponding to the original is always displayed on the forgotten item notification screen 200. Further, a triangle indicates items that can be used in the service. For example, in the copy service, as a payment method, there are cases where payment is made in bills that may cause change (cash settlement) and cases where payment is made by credit card, etc., and so there is a possibility that change will be caused and a possibility that a card will be used. Accordingly, in the copy service, the change and cards correspond to a triangle and are reminder target items, and the individual reminder section (change reminder section) 206*f* (see FIG. 5A, etc.) corresponding to change, and the individual reminder section (card reminder section) 206*e* (see FIG. 5A, etc.) corresponding to cards, are displayed on the forgotten item notification screen 200. A dash indicates that the item is cannot be used (unusable) in the service. For example, network printing does not use any original. Therefore, in network print, an original corresponds to a dash and is not a reminder target item, and the individual reminder section corresponding to an original is not displayed on the forgotten item notification screen 200.

As shown in FIG. 6, in the copy service, an original, printed material, receipts, photographs, change, and cards are reminder target items. In the photo print service, network print, and the content print service, printed material, receipts, photographs, change, and cards are reminder target items. However, in the copy service, the photo print service, network print, and the content print service, either the printed material or the photograph is output, and the other is not output. For example, in copying using the paper for image forming (normal copy), only printed material is output, and in copying using the photograph paper (photograph copy), only a photograph is output.

In the fax service, the items that may be placed and forgotten differ depending on whether a fax is transmitted or received. For example, in the case of a fax transmission service, an original, printed material, receipts, change, and cards are reminder target items. The printed material in the fax transmission service is a fax transmission result table. Although not shown, a transmission result table print setting section for selecting the print setting of the transmission result table (whether to output the transmission result table) is provided in the operation screen for setting the operating conditions of the fax transmission service. That is, the user can select whether to output the transmission result table.

The transmission result table is normally printed by the image forming unit 74 (first image forming unit). However, the transmission result table may be printed by the paper-piece printer 18 (third image forming unit) instead of the image forming unit 74. In addition, the transmission result table normally prints (includes) the transmission result, transmission date and time, destination, and source, but in addition to these, the title of the transmission image or the transmission image (one representative image if a plurality of transmission images exist) may be included.

On the other hand, in the case of a fax reception service, printed material, receipts, change and cards are reminder target items.

In the scanning service, an original, receipts, change and cards are reminder target items. In administrative services, printed material, receipts, change and cards (basic resident register card or personal identification card) are reminder target items.

However, as for change and cards, which are common to all services, there are cases where only change is returned and cases where only cards are used. For example, if the charge is paid by cash, a card is not used. In addition, if the charge is paid by card (for example, electronic money) or if the charge is paid by cash and no change is necessary, change will not be returned. In addition, though common to services other than administrative services, receipts may not be output. Although not shown, a print setting section (receipt print setting section) for selecting the receipt print setting (whether the receipt is output) is provided on the operation screen for setting the operating conditions of each service. That is, the user can select whether to output the receipt.

In addition, the reminder target items include relevant items for which retrieval from a predetermined location at which the items exist cannot be detected (a first-type item) and items for which retrieval from a predetermined location can be detected (a second-type item).

A second-type item is an item provided with a means for detecting whether the item has been retrieved, and in this embodiment is, for example, an original, printed material, a card, or the like. As described above, it is possible to detect whether an original has been retrieved from a predetermined location (document platen) according to the output of the document detection unit 88. In addition, it is possible to detect whether printed material has been retrieved from a predetermined location (paper ejection tray 78) according to the output of the printed material detection unit 94. Depending on whether the cards are in communication with the short-range communication unit 22, it is possible to detect whether the cards have been retrieved from a predetermined location (in the vicinity of the short-range communication unit 22).

In the present embodiment, items other than an original, printed material and cards, such as photographs, receipts and change, are treated as first-type items, but this is just an example and even for items other than an original, printed material and cards, if the item is an item for which retrieval can be detected, it is treated as a second-type item.

Further, in the present embodiment, in the forgotten item reminder unit 202 of the forgotten item notification screen 200, an individual reminder section 206 is displayed corresponding to, among the reminder target items, the first-type items and the second-type items that have not been retrieved from a predetermined location. However, second-type items which are retrieved from a predetermined location are excluded from the reminder target items. The individual reminder section 206 corresponding to an item excluded from the reminder target items is not displayed (hidden). That is, second-type items, which have already been retrieved, are excluded from the reminder target items, and no reminder is given to prevent the occurrence of leaving behind of the item.

FIGS. 5A and 5B show a forgotten item notification screen 200 (200A, 200B) when the copy service is executed. In the copy service, an original, cards, change and the like may be used, and printed material, photographs and receipts may become output items. Accordingly, in the copy service, an original, printed material, photographs, receipts, cards and change are the first-type items and the second-type items.

FIG. 5A shows a forgotten item notification screen 200A in a state where all items have not been retrieved. In this case, six individual reminder sections 206*a* to 206*f* corresponding to all first-type items and all second-type items, that is, corresponding to each of an original, printed material, a photograph, receipts, cards and change, are displayed.

FIG. 5B shows a forgotten item notification screen 200B in a state where the original is retrieved. As described above, an original is a second-type item because it is an item for which retrieval can be detected. Accordingly, in a state when the original is retrieved, the individual reminder section 206*a* corresponding to the original is not displayed, and five individual reminder sections 206*b* to 206*f* corresponding to each of the first-type items and the second-types item excluding the original, namely, printed material, photographs, receipts, cards, and change are displayed. If the original is retrieved before the service ends, the forgotten item notification screen 200B in which the individual reminder section 206a corresponding to the original is hidden from the beginning is displayed. On the other hand, if the original is not retrieved at the point in time when the service ends and the original is retrieved after that, the forgotten item notification screen 200A (see FIG. 5A) on which the individual reminder section 206a corresponding to the original is displayed is temporarily displayed. At the point in time when retrieval of the original is detected, the forgotten item notification screen 200B is displayed. That is, at the point in time when it is detected that the original has been retrieved, the screen display shifts from the forgotten item notification screen 200A to the forgotten item notification screen 200B.

Further, although not shown, when the printed material which is the second-type item is retrieved, the individual reminder section 206b corresponding to the printed material is hidden; and when the cards which are the second-type item are retrieved, the individual reminder section 206e corresponding to the cards is hidden. If the second-type item is retrieved before the service ends, the forgotten item notification screen 200 in which the individual reminder section 206 corresponding to the second-type item that has been retrieved is hidden is displayed from the beginning. (an original is retrieved, for example, on the forgotten item notification screen 200B)

FIG. 5C shows a forgotten item notification screen 200C in a state where the scan service is executed and all the items have not been retrieved. In the scanning service, an original, cards and change and the like may be used, and receipts may become output items. Accordingly, in the copy service, an original, receipts, cards and change are the first-type items and the second-type items. In this case, four individual reminder sections 206a, 206d, 206e, 206f are displayed corresponding to all first-type items and second-type items in the scan service, namely each of an original, receipts, cards, and change. Further, although not shown, when the original, which is a second-type item, is retrieved, the individual reminder section 206a corresponding to the original is hidden.

As described above, in the present embodiment, regardless of what was actually used in the service, the individual reminder sections 206 corresponding to all items that can be used in the relevant service, including items that were not actually used, are displayed on the forgotten item notification screen 200. The individual reminder section 206 corresponding to a second-type item, for which retrieval can be detected, becomes hidden at the point in time when the second-type item is retrieved, but the state of the display remains for the individual reminder section 206 corresponding to items that were not used and first-type items, for which retrieval cannot be detected.

However, after a predetermined time (for example, 2 minutes to 3 minutes) has elapsed from the point in time when the end key 200a is operated or the forgotten item notification screen 200 is displayed, all the individual reminder sections 206 are hidden.

Specifically, when the end key 200a is operated on the forgotten item notification screen 200, the home screen 110 as shown in FIG. 4 is displayed on the display 14 instead of the forgotten item notification screen 200. That is, it can be said that the individual reminder section 206 disappears when the end key 200a is operated.

Further, when a predetermined time period has elapsed from the point in time when the forgotten item notification screen 200 is displayed, the home screen 110 may be displayed, or all the individual reminder sections 206 may be hidden while the forgotten item notification screen 200 is still displayed.

The above-described operation of the information processing system 100 is implemented when the CPU 32 of the information processing apparatus 10 executes an information processing program for the information processing apparatus 10 stored in the RAM 34, and the CPU 82 of the image forming apparatus 70 executes an information processing program for the image forming apparatus 70 stored in the RAM 84. The specific processing will be described later using a flow chart.

Figure 7:
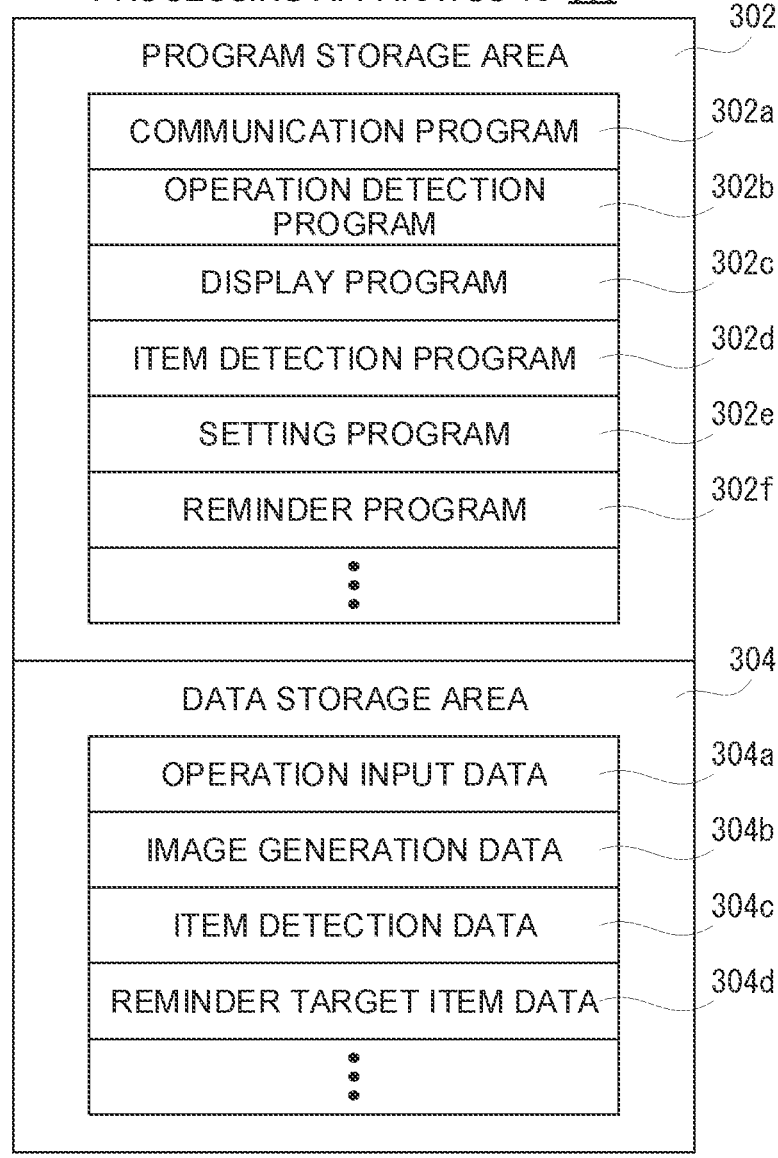
FIG. 7 is a diagram illustrating an example of a memory map of the RAM of the information processing apparatus illustrated in FIG. 2.

FIG. 7 is a diagram illustrating an example of a memory map 300 of the RAM 34 of the information processing apparatus 10 illustrated in FIG. 2. As illustrated in FIG. 7, the RAM 34 includes a program storage area 302 and a data storage area 304. As described above, the information processing program for the information processing apparatus 10 is stored in the program storage area 302 of the RAM 34. The information processing program for the information processing apparatus 10 includes a communication program 302a, an operation detection program 302b, a display program 302c, an item detection program 302d, a setting program 302e, and a reminder program 302f.

The communication program 302a is a program for communicating (transmitting and receiving) data with an image forming apparatus 70, an external computer such as a server, or another device, via a network.

The operation detection program 302b is a program for detecting touch input, and the CPU 32 acquires the touch coordinate data output from the touch panel 12 according to the operation detection program 302b, and the acquired touch coordinate data is stored in the RAM 34 in chronological order.

The display program 302c is a program for generating display image data, that is, screen data such as the various operation screens and the forgotten item notification screen 200 described above, and outputting the display to the display 14 by using the image generation data 304b described later.

The item detection program 302d is a program for detecting the retrieval of a second-type item, based on output from the components for detecting the retrieval of a second-type item (an original, printed material, and cards), such as the document detection unit 88, the printed material detection unit 94, and the short-range communication unit 22.

The setting program 302e is a program for setting items that can be used in a relevant service and items that can be output by the service as reminder target items, depending on the type of service. The setting program 302e is also a program for, among the second-type items, excluding the retrieved items from the reminder target items.

For first-type items and second-type items that have not been retrieved from a predetermined location, the reminder program 302f is also a program for giving a reminder that a reminder target item has been left behind. In this embodiment, when the forgotten item notification screen 200 is displayed on the display 14, the reminder program 302f is a program for displaying the individual reminder section 206 corresponding to first-type items and second-type items that have not been retrieved from predetermined locations and for giving a reminder that a reminder target item has been left behind.

Although not shown, the program storage area 302 stores programs such as a program for setting charges for services and the like in the information processing system 100, a storage medium connection program for controlling the writing of data to various storage media mounted on the storage medium connection unit 16, and the reading of data from the various storage media, a paper-piece printing program for controlling a paper-piece printer 18 to print character strings, images, bar codes, etc. on roll paper, a code reading program for controlling a code reader 20 to extract a code image from a photographic image taken by a laser scanner or a camera and decode the extracted code image, a photograph printing program for controlling a photographic printer 26 to print an image on photograph paper, a short-range communication program for controlling a short-range communication unit 22 to realize data communication with a communication target (for example, an identification card, a membership card, an electronic money medium, etc.), a money processing program which is a program for controlling a currency processing unit 24 to calculate the amount of inserted money and return the coins from the coin return port 24b according to the remaining balance after the charges for predetermined services, and the like, are deducted from the amount of inserted money, as well as for selecting and returning a bill from the bill insertion port, and a program for selecting and executing various functions included in the information processing apparatus 10.

Further, the data storage area 304 of the RAM 34 stores operation input data 304a, image generation data 304b, item detection data 304c, reminder target item data 304d, and the like.

The operation input data 304a is data in which touch coordinate data detected according to the operation detection program 302b is stored in chronological order.

The image generation data 304b is data such as display image data corresponding to various screens displayed on the display 14.

The item detection data 304c is data indicating whether each of the second-type items has been retrieved from a predetermined location.

The reminder target item data 304d is data for the reminder target items that are set according to the setting program 302e.

Although not shown, the data storage area 304 stores data indicating the relationship between the services that can be provided by the information processing system 100 and the reminder target items in each service, other data necessary for executing the information processing program for executing the information processing apparatus 10, and timers (counters) and registers necessary for executing the information processing program for the information processing apparatus 10.

Figure 8:
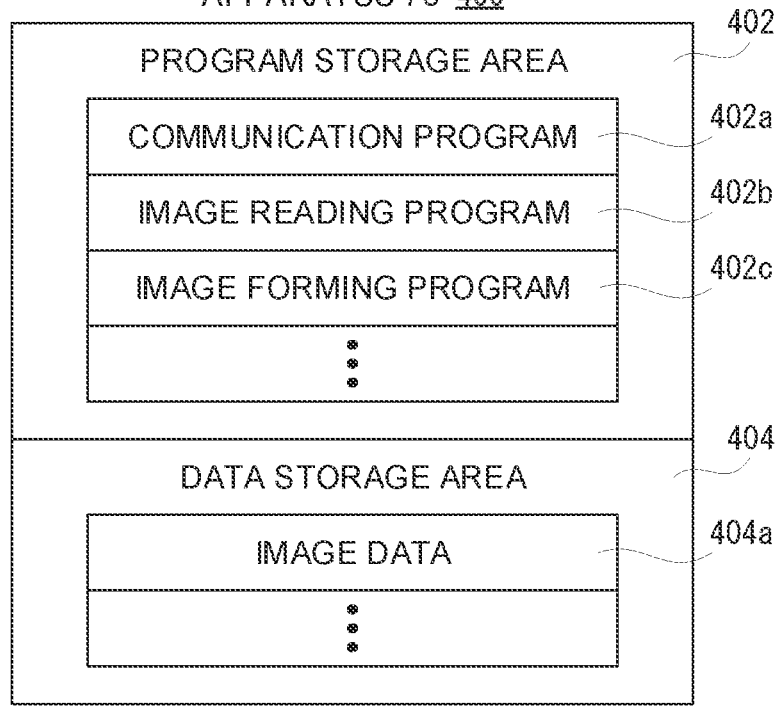
FIG. 8 is a diagram illustrating an example of a memory map of RAM of the image forming apparatus shown in FIG. 3.

FIG. 8 is a diagram illustrating an example of a memory map 400 of a RAM 84 of the image forming apparatus 70 shown in FIG. 3. As illustrated in FIG. 8, the RAM 84 includes a program storage area 402 and a data storage area 404. As described above, the information processing program for the image forming apparatus 70 is stored in the program storage area 402 of the RAM 84. The information processing program for the image forming apparatus 70 includes a communication program 402a, an image reading program 402b, and an image forming program 402c.

The communication program 402a is a program for communicating with an external computer such as an information processing apparatus 10 or a server or another device via a network.

The image reading program 402b is a program for controlling the image reader 72 to read (scan) the image of the document placed on the document placement table in order to output the image signal (scanned image data) corresponding to the read image.

The image forming program 402c is a program for controlling the image forming unit 74 to form a multicolored or monochromatic image on paper for image forming according to the image data 404a, such as scanned image data or input image data.

Although not shown, programs for selecting and executing various functions included in the image forming apparatus 70 are also stored in the program storage area 402.

Further, image data 404a and the like are stored in the data storage area 404 of the RAM 84. The image data 404a is image data read by the image reader 72, image data input from an external computer such as a server, or the like.

Although not shown, the data storage area 404 stores other data necessary for executing the information processing program for the image forming apparatus 70, and is provided with timers (counters) and registers necessary for executing the information processing program for the image forming apparatus 70.

Figure 9:
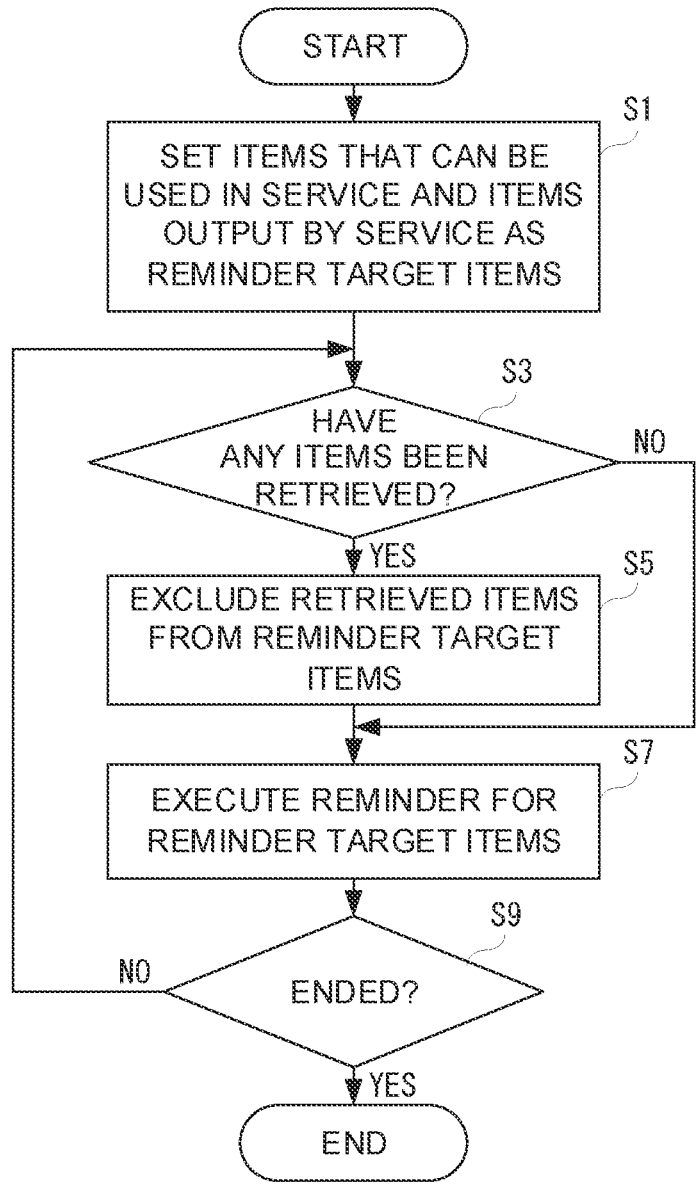
FIG. 9 is a flow chart showing an example of forgotten item reminder processing of the CPU shown in FIG. 2.

FIG. 9 is a flow chart showing an example of forgotten item reminder processing executed by the CPU 32 of the information processing apparatus 10 shown in FIG. 2. This forgotten item reminder processing is started when the service is ended.

As shown in FIG. 9, when having started the forgotten item reminder process, the CPU 32 of the information processing apparatus 10, in step S1, sets the items that can be used in the service and the items that can be output by the service as the reminder target items, and in step S3, determines whether there is any retrieved items among the reminder target items.

If it is "YES" in step S3, that is, if it is determined that there is a retrieved item among the reminder target items, the retrieved item is excluded from the reminder target items in step S5, and the process proceeds to step S7. On the other hand, if it is "NO" in step S3, that is, if it is determined that there are no retrieved items among the reminder target items, the process proceeds to step S7 without performing step S5.

Subsequently, in step S7, a reminder is given for the reminder target item, and the process proceeds to step S9. In this embodiment, in step S7, a forgotten item notification screen 200 is displayed on the display 14 including individual reminder sections 206 corresponding to first-type items and second-type items that have not been retrieved from a predetermined location among the reminder target items.

Subsequently, in step S9, it is determined whether to end the forgotten item reminder process. Here, it is determined that the forgotten item reminder process is ended when the end key 200a is operated or when a predetermined time period has elapsed from the point in time when the forgotten item notification screen 200 is displayed.

If it is "NO" in step S9, that is, if it is determined that the forgotten item reminder process is not to be ended, the process returns to step S3. On the other hand, if it is "YES" in step S9, the forgotten item reminder process ends.

In the first embodiment, among the reminder target items, a reminder is given to prevent the occurrence of leaving behind of items, for a first-type item for which retrieval cannot be detected, and a second-type item for which retrieval can be detected but which has not been retrieved. For this reason, since a reminder to prevent the occurrence of leaving behind of items is also given for items for which retrieval cannot be detected, the users can be made aware that they have left behind an item for which retrieval cannot be detected. In addition, since no reminder is given to prevent leaving behind an item that is already retrieved, it is possible to effectively, and without excessive reminders, avert the occurrence of leaving behind of items.

Further, according to the first embodiment, since a reminder is given to prevent the occurrence of leaving behind of items that can be used in the service and the items that can be output by the service, it is possible to reliably avert the occurrence of leaving behind of an item.

Further, according to the first embodiment, the forgotten item notification screen 200 including the forgotten item reminder unit 202, which is provided to give a reminder to a user that a reminder target item has been left behind, is displayed on the display 14, so that the users can be visually made aware that they have left behind an item, and it is possible to effectively avert the occurrence of leaving behind of an item.

In the first embodiment, the occurrence of leaving behind of an item is prevented since the forgotten item notification screen 200 is displayed on the display 14. However, instead of or in addition to this, the occurrence of leaving behind of the item may also be prevented by a reminder by way of vocal sound (vocal-sound message). For example, a vocal-sound message is output from the speaker 48 to the effect of reminding about the reminder target item being left behind. When a plurality of reminder target items exist, a vocal-sound message is output from the speaker 48 for each reminder target item to the effect of reminding about the reminder target item being left behind. However, the second-type item that has already been retrieved is not qualified as a reminder target item, so no reminder is given by vocal sound (a vocal-sound message to the effect of giving a reminder that the item is left behind, is not output). On the other hand, first-type items, for which retrieval cannot be detected, and second-type items that have not been retrieved are qualified as reminder target items, and a reminder is given by vocal sound for these items. In addition, when giving a reminder about an item being left behind, by vocal sound, if a second-type item exists that has not been retrieved after a predetermined time period has elapsed from the point in time when the vocal-sound message was output, another reminder is given about the item being left behind When the second and subsequent reminders are given, the second-type items that have already been retrieved are excluded from the reminder target items, so no reminder is given for the second-type items that have already been retrieved.

Second Embodiment

The information processing system 100 of the second embodiment is the same as that of the first embodiment except that the items actually used in the service and the items actually output are set as the reminder target items, so the content different from the first embodiment will be described, and duplicate descriptions will be omitted.

In the second embodiment, the items actually used and the items actually output are specified between the start and the end of the service. For example, in the copy service and various print services, whether printed material or a photograph is output depends on the settings of operating conditions of each service. Specifically, it depends on the setting of the conditions (output paper conditions) for printing on photograph paper or printing on image forming paper. The operating conditions of each service are set on various operation screens corresponding to the relevant service, and are confirmed at least once when the service is completed.

Accordingly, in the copy service and various print services, it is possible to specify whether printed material or a photograph is output.

Whether the fax transmission result table is output by the fax transmission service depends on the print settings of the transmission result table. Accordingly, in the fax transmission service, it is possible to specify whether a transmission result table is output by reading the print settings of the transmission result table.

Furthermore, whether a fax receipt is output for services other than administrative services depends on the print settings of the receipt. Accordingly, in services other than administrative services, it is possible to specify whether the transmission result table is output by reading the print settings of the receipt.

Furthermore, whether cards are used in each service depends on the setting of conditions for payment of charges for each service. Specifically, it depends on the condition (condition for payment of charges) of the charge being paid by cash, or the charge being paid by card. Accordingly, it is possible to specify whether cards are used by reading the settings of the conditions for payment of charges. In addition, it is possible to specify whether change will be returned by the settings of conditions for payment of charges and by the difference of the charge and the inserted money.

Then, in the second embodiment, the items actually used and the items actually output between the start and the end of the service are set as the reminder target items. Further, in the forgotten item reminder unit 202 of the forgotten item notification screen 200, individual reminder sections 206 are displayed corresponding to, among the reminder target items, the first-type items and the second-type items that have not been retrieved from a predetermined location.

Figures 11, 12:
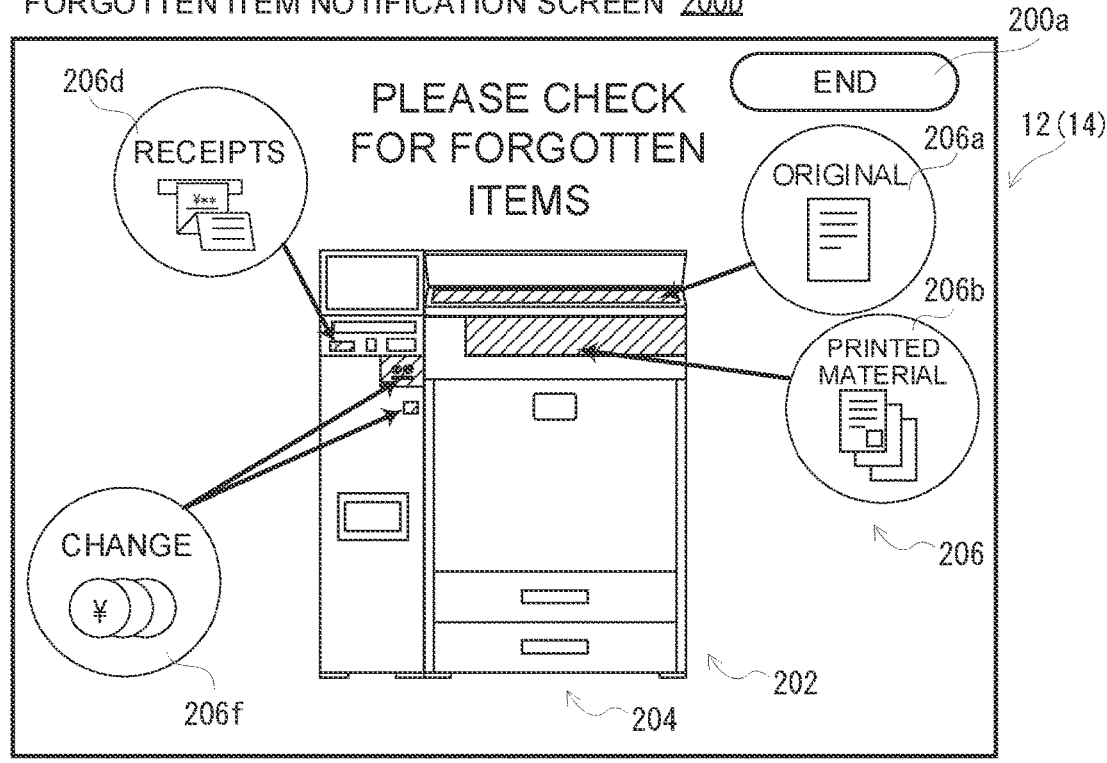
FIG. 11 is a diagram showing items that become targets of reminders about leaving behind of an item in the copy service in the second embodiment.
FIG. 12 is an illustrative view showing an example of a forgotten item notification screen.

FIG. 11 shows an example of the relationship between a service in the second embodiment and reminder target items in the service. However, a circle shown in FIG. 11 indicates the items actually used and the items actually output between the start and the end of the service, and a dash indicates the items that cannot not be used for that service (unusable) and items that are not used between the start and the end of the service. In the example shown in FIG. 12, it is shown that the output of a receipt is selected, between printed materials and photographs, printed materials will be output, payment will be made by cash settlement, and change will be necessary. A photograph is not printed and cards are not used. Accordingly, each of an original, printed material, receipts, and change corresponds to a circle and is a reminder target item, and photographs and cards correspond to a dash and are reminder target items.

FIG. 12 shows a forgotten item notification screen 200D when the copy service is executed, which corresponds to the example shown in FIG. 11. As shown in FIG. 12, on the forgotten item notification screen 200D, four individual reminder sections 206a, 206b, 206d, 206f corresponding to an original, printed material, receipts, and change, which are the reminder target items, are displayed, and the individual reminder sections 206 corresponding to photographs and cards are not displayed.

Further, in the second embodiment, in order to realize the above-described operation, a specific program for specifying the items actually used and the items actually output between the start and the end of the service is included within the information processing program for the information processing apparatus 10 stored in the RAM 34 of the information processing apparatus 10. Further, the setting program 302e is a program for setting the items actually used and the items actually output between the start and the end of the service as reminder target items.

Hereinafter, forgotten item reminder processing in the second embodiment will be described using a flow chart, but the processes which are the same as in the forgotten item reminder processing described in the first embodiment will be given the same reference numerals and the description will be omitted or will be described briefly for duplicated content.

Figure 10:
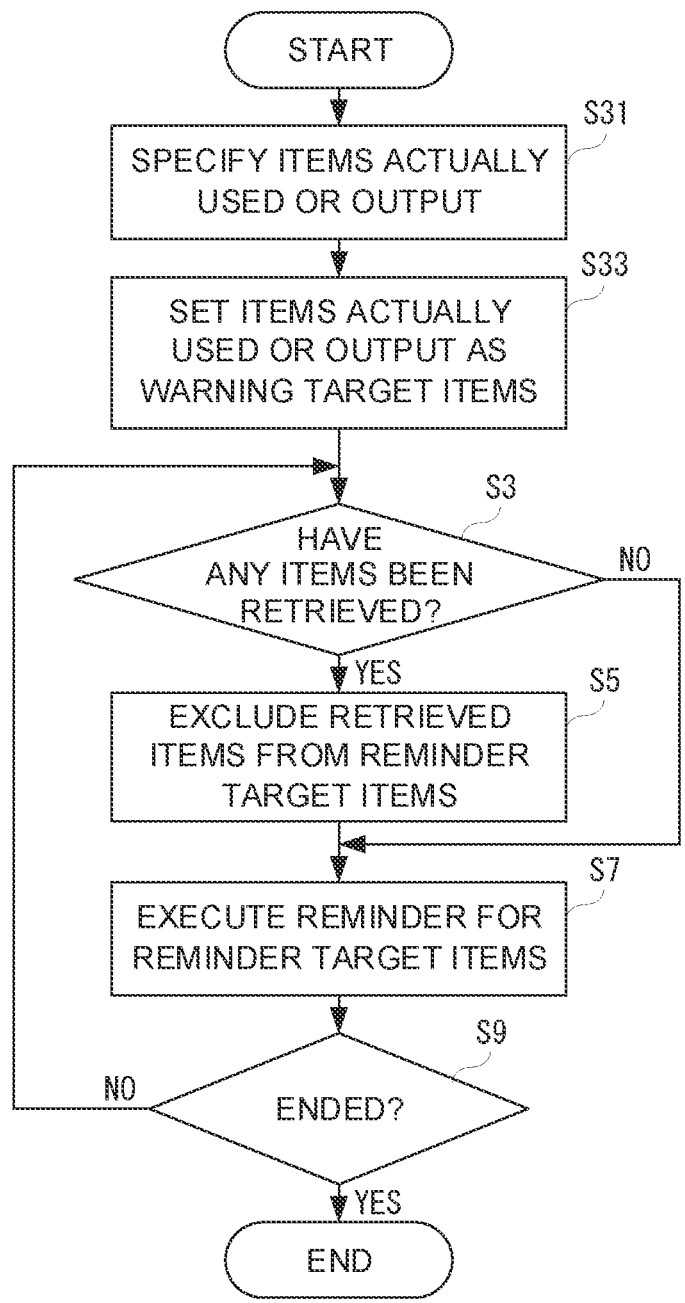
FIG. 10 is a flow chart showing an example of information processing in the second embodiment.

FIG. 10 is a flow chart showing an example of forgotten item reminder processing in the second embodiment. As shown in FIG. 10, when having started the forgotten item reminder process, the CPU 32 of the information processing apparatus 10, in step S31, specify the items actually used and actually output during the period from the start to the end of the service. In step S33, the items actually used and actually output between the start and the end of the service are set as the reminder target items, and the process proceeds to step S3. Since the contents of the processes of step S3 and thereafter are the same as those in the first embodiment, the description thereof will be omitted.

According to this second embodiment, since a reminder is given for the items actually used and the items actually output in the service being left behind, it is possible to appropriately avert the occurrence of leaving behind of an item.

Third Embodiment

The information processing system 100 of the third embodiment is the same as that of the first embodiment except that the reminder may be stopped when the reminder target item is selected by the user on the forgotten item notification screen 200. The contents different from the first embodiment will be described and duplicate descriptions will be omitted.

In the third embodiment, when the individual reminder section 206 (icon and arrow) corresponding to a first-type item or a portion indicated by the arrow in an external diagram 204 corresponding to a first-type item is selected by the user (hereinafter collectively referred to as "when a first-type item is selected"), the reminder for the relevant individual reminder section 206 or the relevant portion corresponding first-type item is stopped. That is, when the first-type item is selected, it is presumed that the selected first-type item has been retrieved, and the individual reminder section 206 for the first-type item is hidden.

However, when an individual reminder section 206 corresponding to a second-type item is displayed, and the individual reminder section 206 corresponding to the relevant second-type item or a portion indicated by an arrow in the external diagram 204 corresponding to the relevant second-type item is selected, (hereinafter, collectively referred to as "when a second-type item is selected"), the reminder is not stopped. As described in the first embodiment, the individual reminder section 206 corresponding to a second-type item is hidden when the item is retrieved from a predetermined location regardless of whether it is selected (the reminder is stopped). That is, the individual reminder section 206 corresponding to the second-type item that has not been retrieved is displayed.

In addition, when a second-type item is selected while the individual reminder section 206 corresponding to the relevant second-type item is displayed, that is, when the selected second-type item is not retrieved, a warning is given. For example, a warning is given to the effect of the user's perception, that the item has been retrieved, does not match the situation, which is that the item has not been retrieved. That is, a warning is given to the effect that the user has misperceived that the item has been retrieved.

Further, in the third embodiment, in order to realize the above-described operation, the information processing program for the information processing apparatus 10 stored in the RAM 34 of the information processing apparatus 10 includes a warning program or the like that gives a warning when an individual reminder section 206 corresponding to the second-type item or a portion indicated by an arrow in an external diagram 204 corresponding to the second-type item is selected, and when the selected second-type item is not retrieved.

Hereinafter, forgotten item reminder processing in the third embodiment will be described using a flow chart, but the processes which are the same as in the forgotten item reminder processing described in the first embodiment will be given the same reference numerals and the description will be omitted or will be described briefly for duplicated content.

Figure 13:
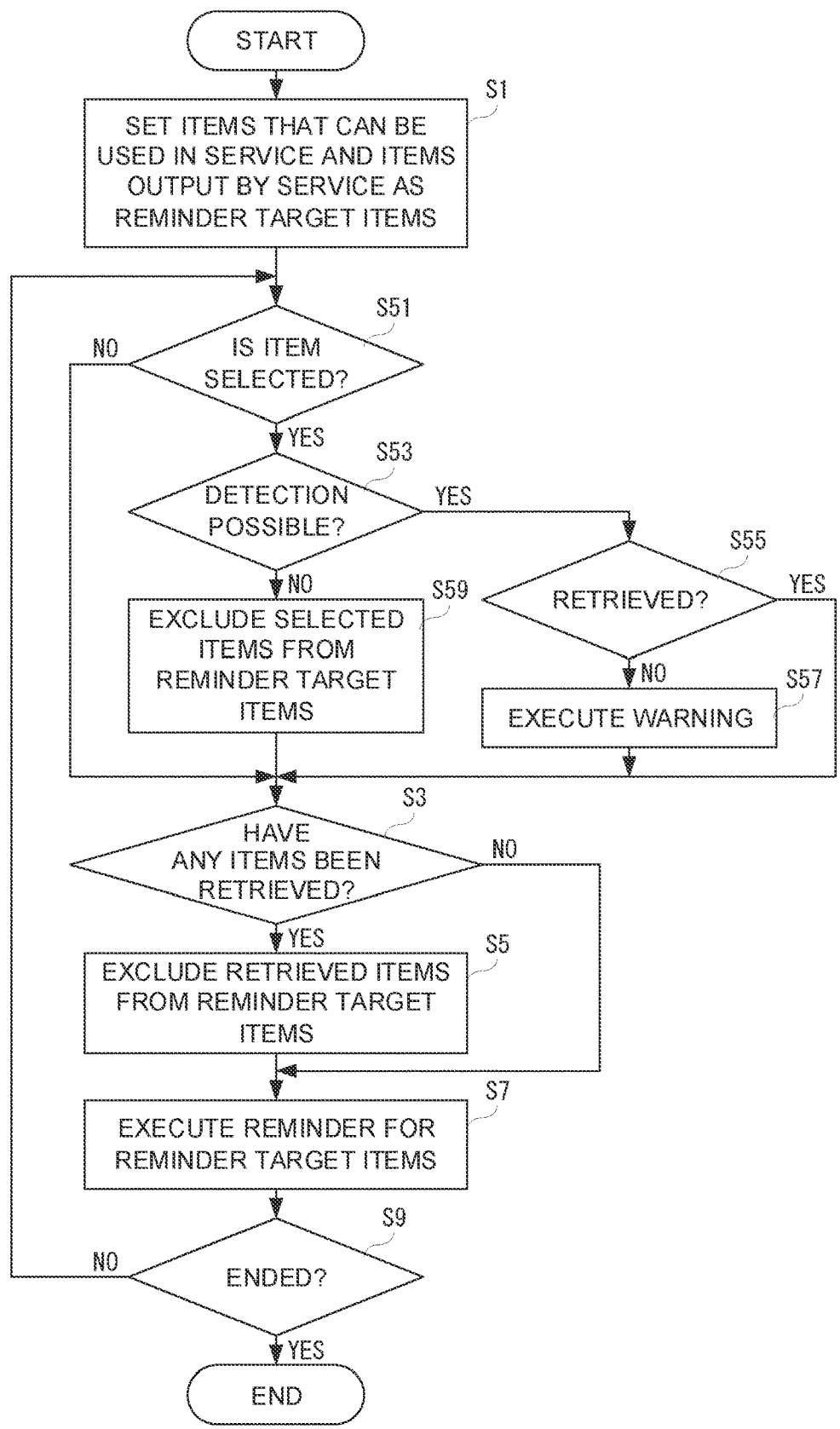
FIG. 13 is a flow chart showing an example of information processing in the third embodiment.

FIG. 13 is a flow chart showing a part of an example of the forgotten item reminder processing in the third embodiment. As shown in FIG. 13, when the CPU 32 of the information processing apparatus 10 starts the forgotten item reminder process, in step S1, the CPU 32 of the information processing apparatus 10 sets the items that can be used in the service and the items that can be output by the service as the reminder target items, and in step S51, determines whether a reminder target item is selected by the user on the forgotten item notification screen 200.

If it is "NO" in step S51, that is, if it is determined on the forgotten item notification screen 200 that a reminder target item is not selected by the user, the process proceeds to step S3. On the other hand, if it is "YES" in step S51, that is, when it is determined on the forgotten item notification screen 200 that the reminder target item has been selected by the user, in step S53, whether the retrieval of the selected item from a predetermined location can be detected, that is, whether it is a second-type item, is determined.

If it is "YES" in step S53, that is, if it is determined that the retrieval of the selected item from a predetermined location can be detected, in step S55, whether the selected item has been retrieved from the predetermined location is determined. If it is "NO" in step S55, that is, if it is determined that the selected item has not been retrieved from the predetermined location, a warning is executed in step S57 and the process proceeds to step S3. On the other hand, if it is "YES" in step S55, that is, if it is determined that the selected item has been retrieved from the predetermined location, the process proceeds to step S3.

Further, if it is "NO" in step S53, that is, if it is determined that the retrieval of the item from a predetermined location cannot be detected, the selected item is excluded from the reminder target items in step S59 and the processing proceeds to step S3. If it is "NO" in step S9, the contents of the processes of step S3 and thereafter, except that the process returns to step S51, are the same as those in the first embodiment and thus the description thereof will be omitted.

According to the third embodiment, when the individual reminder section 206 corresponding to a first-type item or the portion indicated by an arrow in the external diagram 204 corresponding to a first-type item is selected, the reminder corresponding to that the first-type item, that corresponds to the relevant individual reminder section 206 or the relevant portion, is stopped, and it is possible to effectively, and without excessive reminders, avert the occurrence of leaving behind of the item.

Further, according to the third embodiment, when an individual reminder section 206 corresponding to a second-type item or the portion indicated by the arrow in the external diagram 204 corresponding to a second-type item is selected, if the second-type item is not retrieved, a warning is given to prevent the occurrence of leaving behind of the item, so that it is possible to appropriately avert the occurrence of leaving behind of the item.

Note that the conditions shown in the third embodiment can be adopted in combination with the second embodiment.

Further, the specific configurations and the like given in the above-described embodiments are examples, and can be appropriately changed according to the actual product.

Further, in the above-described embodiment, the information processing apparatus 10 includes a display 14 with a touch panel 12, and an operation screen is displayed on the display 14, but the present invention is not limited to this. For example, the image forming apparatus 70 may include a display with a touch panel (corresponding to the first display). In this case, the display 14 with the touch panel 12 of the information processing apparatus 10 may be omitted, or the information processing apparatus 10 may include the display 14 with the touch panel 12 (a configuration where both the information processing apparatus 10 and the image forming apparatus 70 include a display with a touch panel). However, when the display 14 with the touch panel 12 of the information processing apparatus 10 is omitted, the operation screen is displayed on the display of the image forming apparatus 70. Further, when both the information processing apparatus 10 and the image forming apparatus 70 include a display with a touch panel, the operation screen may be displayed on each display, or the operation screen may be displayed on one of the displays. When the operation screen is displayed on the display of the image forming apparatus 70, the user can set a job or the like on the relevant operation screen by touch input into the touch panel of the image forming apparatus 70.

DESCRIPTION OF REFERENCE NUMERALS

10 Information processing apparatus
12 Touch panel
14 Display
32 CPU
34 RAM
36 ROM
70 Image forming apparatus

What is claimed is:

1. An information processing apparatus that is provided with a touch panel display and provides a predetermined service to a user by operating the touch panel display, the information processing apparatus comprising:
   a non-transitory machine-readable medium that stores instructions; and
   a processor that executes the instructions stored in the non-transitory machine-readable medium to:
      detect whether an item, among a plurality of items including at least one property of a plurality of properties of the user for use in the information processing apparatus, has been retrieved and output items, among the plurality of items, in connection with a service; and
      display a notification on the touch panel display to prevent occurrence of leaving behind a first-type item, among the plurality of items, without detecting whether the first-type item is recovered after the service is executed by a touch operation of the touch panel display; and
      set the first-type item as a notification target item after the service is executed,
   wherein
   the notification target item includes at least one of a property of the user that is usable in the service and an output item that is output in connection with the service.

2. The information processing apparatus according to claim 1, wherein the processor further executes the instructions to:
   specify, among the plurality of items, the at least one of the property of the user that is actually used in the service and an output item that is actually output in connection with the service, and
   set the at least one of the property of the user that is actually used in the service and the output item that is actually output in connection with the service, as the notification target item.

3. The information processing apparatus according to claim 1,
   wherein, on the touch panel display, a notification screen, including a notification section to prevent the occurrence of leaving behind the notification target item, is displayed.

4. The information processing apparatus according to claim 3, wherein the notification section includes at least one of an image and a character string indicating the notification target item.

5. The information processing apparatus according to claim 3,
   wherein the notification section includes an external diagram of the information processing apparatus, and
   a predetermined portion, in the external diagram corresponding to a predetermined location where the notification target item exists, is displayed with emphasis.

6. The information processing apparatus according to claim 1, further comprising a speaker,
   wherein a vocal sound is output from the speaker to prevent the occurrence of leaving behind of the notification target item.

7. The information processing apparatus according to claim 6, wherein the vocal sound for the notification target item and a vocal sound for a second-type item that has not been retrieved, among second-type items for which retrieval is detectable and have not been retrieved, are output from the speaker.

8. The information processing apparatus according to claim 1, further comprising a speaker,
   wherein a vocal sound for a retrieved item, among second-type items, for which retrieval is detectable and has been retrieved, is not output from the speaker.

9. The information processing apparatus according to claim 1, wherein the processor further executes the instructions to detect a presence or an absence of a printed material ejected to an ejection tray.

10. An information processing system comprising:
    the information processing apparatus according to claim 1; and
    an image forming apparatus capable of communicating with the information processing apparatus,
    wherein the predetermined service is provided to the user by cooperation of the information processing apparatus and the image forming apparatus.

11. An information processing apparatus that is provided with a touch panel display and provides a predetermined service to a user by operating the touch panel display, the information processing apparatus comprising:
- a non-transitory machine-readable medium that stores instructions; and
- a processor that executes the instructions stored in the non-transitory machine-readable medium to:
  - detect whether an item, among a plurality of items including at least one property of a plurality of properties of the user for use in the information processing apparatus, has been retrieved and output items, among the plurality of items, in connection with a service; and
  - display a notification on the touch panel display to prevent occurrence of leaving behind a first-type item, among the plurality of items, without detecting whether the first-type item is recovered after the service is executed by a touch operation of the touch panel display,
- wherein, on the touch panel display, a notification screen, including a notification section to prevent the occurrence of leaving behind a notification target item of the first-type item, is displayed,
- wherein the processor further executes the instructions to accept a user operation,
- wherein the notification section includes an individual notification section corresponding to each of a plurality of notification target items, including the notification target item, and
- wherein, when the individual notification section, corresponding to the first-type item or a predetermined portion in an external diagram that corresponds to the first-type item, is selected by the user, a display of the notification, for an item corresponding to a relevant individual notification section or to the predetermined portion, is stopped.

12. The information processing apparatus according to claim 11, wherein the processor further executes the instructions to provide a warning when:
- an individual notification section corresponding to a second-type item for which retrieval is detectable and has not been retrieved, or
- a predetermined portion corresponding to the second-type item is selected, and a relevant second-type item is not retrieved.

13. An information processing apparatus that is provided with a touch panel display and provides a predetermined service to a user by operating the touch panel display, the information processing apparatus comprising:
- a non-transitory machine-readable medium that stores instructions; and
- a processor that executes the instructions stored in the non-transitory machine-readable medium to:
  - detect whether an item, among a plurality of items including at least one property of a plurality of properties of the user for use in the information processing apparatus, has been retrieved and output items, among the plurality of items, in connection with a service; and
  - display a notification on the touch panel display to prevent occurrence of leaving behind a first-type item, among the plurality of items, without detecting whether the first-type item is recovered after the service is executed by a touch operation of the touch panel display,
- wherein the information processing apparatus is capable of providing a plurality of services to the user, and
- wherein a notification content for leaving behind the first-type item differs depending on different services in the plurality of services.

14. A control method performed by an information processing apparatus that is provided with a touch panel display and provides a predetermined service to a user by operating the touch panel display, the control method comprising:
- detecting whether an item, among a plurality of items including at least one property of a plurality of properties of the user for use in the information processing apparatus, has been retrieved and outputting items, among the plurality of items, in connection with a service;
- displaying a notification on the touch panel display to prevent occurrence of leaving behind a first-type item, among the plurality of items, without detecting whether the first-type item is recovered after the service is executed by a touch operation of the touch panel display; and
- setting the first-type item as a notification target item after the service is executed, wherein
- the notification target item includes at least one of a property of the user that is usable in the service and an output item that is output in connection with the service.

* * * * *